US009468975B2

(12) United States Patent
Nel et al.

(10) Patent No.: US 9,468,975 B2
(45) Date of Patent: Oct. 18, 2016

(54) TREATMENT OF CHEMICAL FEEDSTOCKS

(71) Applicant: The South African Nuclear Energy Corporation Limited, District Brits (ZA)

(72) Inventors: Johannes Theodorus Nel, Kempton Park (ZA); Willem Liebenberg Retief; Johan Louis Havenga, Centurion (ZA); Wilhelmina Du Plessis, Centurion (ZA); Johannes Petrus Le Roux, Pretoria (ZA)

(73) Assignee: The South African Nuclear Energy Corporation Limited, Gauteng Province (ZA)

( * ) Notice: Subject to any disclaimer, the term of this patent is extended or adjusted under 35 U.S.C. 154(b) by 378 days.

(21) Appl. No.: 14/350,608

(22) PCT Filed: Oct. 11, 2012

(86) PCT No.: PCT/IB2012/055511
§ 371 (c)(1),
(2) Date: Apr. 9, 2014

(87) PCT Pub. No.: WO2013/054282
PCT Pub. Date: Apr. 18, 2013

(65) Prior Publication Data
US 2014/0238195 A1 Aug. 28, 2014

(30) Foreign Application Priority Data
Oct. 11, 2011 (ZA) .................. 2011/07455

(51) Int. Cl.
*C22B 4/00* (2006.01)
*B22F 9/18* (2006.01)
(Continued)

(52) U.S. Cl.
CPC ................ *B22F 9/18* (2013.01); *C22B 4/005* (2013.01); *C22B 4/04* (2013.01); *C22B 34/14* (2013.01)

(58) Field of Classification Search
CPC ........... B22F 9/18; C22B 4/005; C22B 4/04; C22B 34/14
See application file for complete search history.

(56) References Cited

U.S. PATENT DOCUMENTS 4,080,194 A    3/1978  Fey
4,107,445 A *  8/1978  Wolf .................. C22B 4/08
                                              373/22
5,688,477 A   11/1997  Nel

FOREIGN PATENT DOCUMENTS

EP          0071351 B1    10/1985
WO     WO 2011/013085 A1   2/2011
(Continued)

OTHER PUBLICATIONS

Bester et al. "Metallic zirconium production by hydrogen reduction of $ZrCl_4$ in a transferred arc torch", *J. High Temp. Chem. Processes* 3 (1):105-112 1992.
(Continued)

*Primary Examiner* — Colleen Dunn
(74) *Attorney, Agent, or Firm* — Myers Bigel & Sibley, P.A.

(57) ABSTRACT

A process for treating a zirconium containing feedstock includes fluorinating a feedstock comprising dissociated zircon ('DZ') to obtain a zirconium fluorine compound and a silicon fluorine compound. The zirconium fluorine compound is separated from the silicon fluorine compound is provided. Optionally, the zirconium fluorine compound is reacted with a non-fluorine halogen, an alkali metal non-fluorine halide or an alkaline-earth metal non-fluorine halide, thereby to obtain a zirconium non-fluorine halide. The zirconium fluorine compound or, when present, the zirconium non-fluorine halide is subjected to plasma reduction, in a plasma reduction stage, in the presence of a reductant, to obtain metallic zirconium.

13 Claims, 1 Drawing Sheet

(51) Int. Cl.
*C22B 4/04* (2006.01)
*C22B 34/14* (2006.01)

(56) References Cited

FOREIGN PATENT DOCUMENTS

| WO | WO2011/030301 | * | 3/2011 |
| WO | WO 2011/030301 A1 | | 3/2011 |

OTHER PUBLICATIONS

International Search Report corresponding to International Application No. PCT/IB2012/055511 mailed Jan. 15, 2013.
International Preliminary Report on Patentability corresponding to International Application No. PCT/IB2012/055511 mailed Nov. 8, 2013.

* cited by examiner

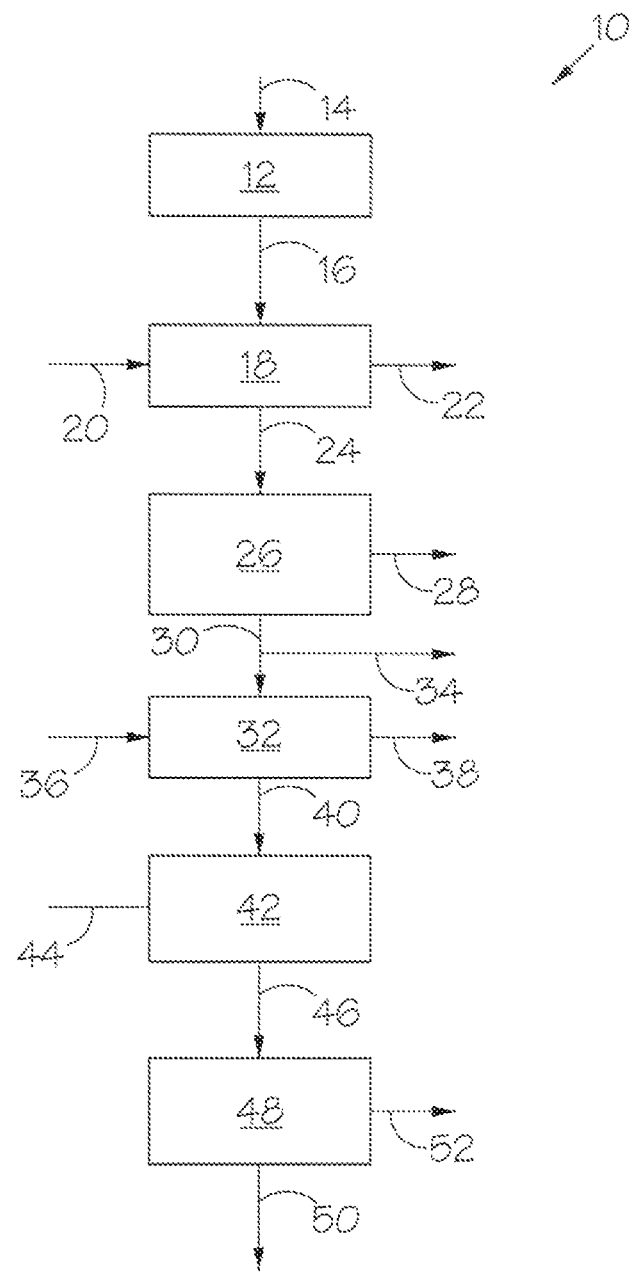

TREATMENT OF CHEMICAL FEEDSTOCKS

RELATED APPLICATIONS

This application is a 35 U.S.C. §371 national stage application of PCT application Ser. No. PCT/IB2012/055511, filed on Oct. 11, 2012, which claims priority from South African application Ser. No. 2011/07455, filed on Oct. 11, 2011, the contents of which are incorporated herein by reference in the entireties. The above-refenced PCT International Application was published as International Publication No. WO 2013/054282 A1 Apr. 18, 2013.

THIS INVENTION relates to the treatment of chemical feedstocks. It relates in particular to a process for treating a zirconium containing feedstock.

According to the invention, there is provided a process for treating a zirconium containing feedstock, which includes
  fluorinating a feedstock comprising dissociated zircon ('DZ') to obtain a zirconium fluorine compound and a silicon fluorine compound;
  separating the zirconium fluorine compound from the silicon fluorine compound;
  optionally, reacting the zirconium fluorine compound with a non-fluorine halogen, an alkali metal non-fluorine halide or an alkaline-earth metal non-fluorine halide, thereby to obtain a zirconium non-fluorine halide; and
  subjecting the zirconium fluorine compound or, when present, the zirconium non-fluorine halide to plasma reduction, in a plasma reduction stage, in the presence of a reductant, to obtain metallic zirconium.

The feedstock may initially be in the form of plasma dissociated zircon ('PDZ'). Instead, the process may include subjecting zircon to plasma dissociation to obtain the PDZ. PDZ predominantly or even wholly comprises $ZrO_2.SiO_2$, but may also contain some hafnium, typically in the form of $HfO_2.SiO_2$.

The zirconium fluorine compound may be a non-oxygen containing compound, e.g. a zirconium fluoride, or it may be an oxygen containing compound, e.g. a zirconium oxyfluoride, or a mixture of such compounds.

The fluorination of the feedstock may comprise reacting the PDZ with an ammonium acid fluoride having the formula $NH_4F.xHF$ where $1<x\leq 5$.

Instead, the fluorination of the feedstock may comprise reacting the PDZ with ammonium bifluoride, $NH_4F.HF$. The reaction may then be in accordance with reaction (1):

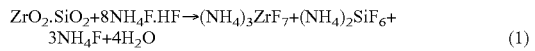

$$ZrO_2.SiO_2 + 8NH_4F.HF \rightarrow (NH_4)_3ZrF_7 + (NH_4)_2SiF_6 + 3NH_4F + 4H_2O \qquad (1)$$

with the $(NH_4)_3ZrF_7$, $(NH_4)_2SiF_6$, $3NH_4F$ and $4H_2O$ thus constituting a reaction product mixture.

When the PDZ contains hafnium, a similar reaction will take place in respect of the Hf, typically in the form of $HfO_2.SiO_2$.

The separation of the zirconium fluorine compound $((NH_4)_3ZrF_7)$ from the silicon fluorine compound $((NH_4)_2SiF_6)$ may be effected by heating the reaction product mixture to a sufficiently high temperature so that the $(NH_4)_2SiF_6$, $NH_4F$ and $H_2O$ are driven off as a gaseous product component, while the $(NH_4)_3ZrF_7$ remains behind as a solid component; thereafter heating the solid component further so that the $(NH_4)_3ZrF_7$ decomposes in accordance with reaction (2):

$$(NH_4)_3ZrF_7 \rightarrow ZrF_4 + 3NH_4F \qquad (2)$$

and separating the $ZrF_4$ from the $NH_4F$.

The temperature at which $(NH_4)_2SiF_6$ evaporates is around 280° C., thus permitting it to be driven off together with the $NH_4F$ and $H_2O$ as the gaseous product. The $(NH_4)_2SiF_6$ can then be decomposed to produce silicon tetrafluoride ($SiF_4$) or other Si compounds and ammonium fluoride ($NH_4F$), in accordance with reaction (3):

$$(NH_4)_2SiF_6 \rightarrow SiF_4 + 2NH_4F \qquad (3)$$

The resultant ammonium fluoride ($NH_4F$) can, if desired, be recycled for use in reaction (1).

The $(NH_4)_3ZrF_7$ decomposes above about 300° C.

The treatment of PDZ with ammonium bifluoride may be in accordance with PCT/IB2010/053448 which is hence incorporated herein by reference.

The treatment of PDZ with an ammonium acid fluoride may be in accordance with PCT/IB2010/054067 which is hence incorporated herein by reference.

It will be appreciated that when the PDZ contains hafnium, hafnium fluorides such as hafnium tetrafluoride will also be produced when the PDZ is reacted with the ammonium bifluoride or an ammonium acid fluoride.

The process may then include, when both zirconium tetrafluoride ($ZrF_4$) and hafnium tetrafluoride ($HfF_4$) are produced, separating the zirconium tetrafluoride from the hafnium tetrafluoride. Such separation will be required, for example, if nuclear grade zirconium metal, i.e. hafnium depleted zirconium metal, typically having a hafnium content less than 100 ppm, is required as the end product.

This separation may be effected by means of sublimation, selective precipitation and crystallization, liquid/liquid extraction, evaporative pertraction, evaporative distillation, or the like.

The non-fluorine halogen with which the zirconium fluorine compound may be reacted may, at least in principle, be any of the halogens other than fluorine, i.e. chlorine, bromine or iodine; however, chlorine is preferred. Similarly, when the zirconium fluorine compound is reacted with the alkali metal non-fluorine halide or the alkaline-earth non-fluorine halide, the halogen of the halide may be any of the halogens other than fluorine, i.e. chlorine, bromine or iodine; however, chlorine is preferred. For example, an alkaline-earth metal non-fluorine halide may be used, and may then be magnesium chloride, $MgCl_2$.

The reaction of the zirconium fluorine compound ($ZrF_4$) with the alkaline-earth metal non-fluorine halide, when carried out, may be effected in a high temperature stage, such as in an arc. When the alkaline-earth non-fluorine halide is $MgCl_2$, the reaction proceeds in accordance with reaction (4):

$$ZrF_4 + 2MgCl_2 \rightarrow ZrCl_4 + 2MgF_2 \qquad (4)$$

It was found that conversion of the zirconium tetrafluoride ($ZrF_4$) to zirconium tetrachloride ($ZrCl_4$) reduces the reaction temperature in the plasma reduction to produce powdered metallic zirconium.

The reductant may be a metal selected from the group consisting in Mg, Ca and Zn. Instead, the reductant may be a reducing gas selected from the group consisting of $H_2$ and $NH_3$.

In the reduction process, a mixture of metallic zirconium and an equivalent reductant halide, e.g. chloride, is thus formed.

Subjecting the zirconium fluorine compound or, when present, the zirconium non-fluorine halide to plasma reduction may be carried out in a plasma reactor. The plasma reactor may provide a non-transferred arc plasma for carrying out the plasma reduction. Preferably, the plasma

reactor is an axial flow reactor, typically having a single axially mounted torch. The plasma may be generated with a plasma gas, or mixtures of plasma gases, such as argon, nitrogen and helium. The metallic zirconium produced in the plasma reactor may be in powdered metallic form e.g. when removed from the reactor.

The initial feedstock may be obtained from a single feedstock source or from a plurality of feedstock sources. Where the feedstock is obtained from different feedstock sources, the feedstock may either be introduced into the reactor discretely along separate feedstock feed lines, or as a feedstock mixture along a single feedstock feed line.

The secondary feedstock, i.e. the zirconium fluorine compound or the zirconium non-fluorine halide, may be introduced into the plasma reactor above the plasma flame, directly into the plasma flame or beneath the plasma flame. The plasma thus serves, amongst others, to heat up the secondary feedstock to a temperature at which the reduction can take place.

The plasma reduction is preferably effected on a continuous basis. It is, however expected that the plasma reduction can also be effected on a batch basis. Preferably, the process of the invention is a continuous process.

The feedstock to the plasma reduction stage, i.e. the secondary feedstock, thus comprises zirconium tetrafluoride ($ZrF_4$) or zirconium tetrachloride ($ZrCl_4$). Additionally, the feedstock may comprise some hafnium tetrafluoride ($HfF_4$) or hafnium tetrachloride ($HfCl_4$). This could typically be the case, for example, (i) if the secondary feedstock comprises zirconium tetrafluoride ($ZrF_4$) or zirconium tetrachloride ($ZrCl_4$) that contains hafnium (Hf) as an impurity, being associated with the initial primary mineral feedstock, or (ii) if the secondary feedstock comprises zirconium tetrachloride in which the hafnium content has been reduced.

When the secondary feedstock comprises zirconium tetrafluoride and the reductant is magnesium, the plasma reduction reaction will be in accordance with reaction (5):

$$ZrF_4 + 2Mg \rightarrow Zr + 2MgF_2 \qquad (5)$$

When the secondary feedstock comprises zirconium tetrachloride and the reductant is magnesium, the plasma reduction reaction will be in accordance with reaction (6):

$$ZrCl_4 + 2Mg \rightarrow Zr + 2MgCl_2 \qquad (6)$$

When the secondary feedstock comprises hafnium tetrafluoride and the reductant is magnesium, the plasma reduction reaction will be in accordance with reaction (7):

$$HfF_4 + 2Mg \rightarrow Hf + 2MgF_2 \qquad (7)$$

When the secondary feedstock comprises hafnium tetrachloride and the reductant is magnesium, the plasma reduction reaction will be in accordance with reaction (8):

$$HfCl_4 + 2Mg \rightarrow Hf + 2MgCl_2 \qquad (8)$$

When the reductant is $H_2$, the plasma reduction reaction will be in accordance with reaction (9):

$$ZrCl_4 + 2H_2 \rightarrow Zr + 4HCl \qquad (9)$$

The reductant, i.e. for example Mg, Ca, Zn, $H_2$ or $NH_3$, would typically be used in stoichiometric amounts, but can also be used in amounts in excess of or less than stoichiometric amounts.

In the plasma reduction stage, a product component comprising the zirconium in powdered metallic form and the reductant halide is produced. The product component may then be treated in a high temperature separation stage to produce the reductant halide as an off-product and the zirconium in a purified metal sponge form as a useful end product.

An advantage of the process of the invention, when ammonium bifluoride or ammonium acid fluoride is used to convert the PDZ to zirconium tetrafluoride is that the process is 'dry', i.e. anhydrous zirconium tetrafluoride is obtained. Dry processing generally generates less waste product than wet processing does.

Another advantage of the invention is that all or at least a part of the reductant halide, e.g. $MgF_2$ or $MgCl_2$, is already evaporated in the plasma reactor in the same step, thereby eliminating or reducing the subsequent purification and separation process.

The invention will now be described in more detail with reference to the accompanying block diagram which illustrates the process according to the invention for treating a zirconium and hafnium containing feedstock.

In the drawing, reference numeral 10 generally indicates a process according to the invention for treating a zirconium and hafnium containing feedstock.

The process 10 includes a plasma dissociation stage 12, with a zircon feed line 14 leading into the stage 12.

A PDZ transfer line leads from the stage 12 to a reaction stage 18. An ammonium bifluoride feed line 20 leads into the stage 18, while an off-gas withdrawal line 22 leads from the stage 18.

A zirconium tetrafluoride ($ZrF_4$) and hafnium tetrafluoride ($HfF_4$) withdrawal line 24 leads from the stage 18 to a $ZrF_4/HfF_4$ separation stage 26. An $HfF_4$ product withdrawal line 28 leads from the stage 26.

A $ZrF_4$ line 30 leads from the stage 26 to a conversion stage 32. An optional $ZrF_4$ product withdrawal line 34 leads from the line 30.

A magnesium chloride ($MgCl_2$) feed line 36 leads into the stage 32, while a magnesium fluoride ($MgF_2$) withdrawal line 38 leads from the stage 32.

A zirconium tetrachloride ($ZrCl_4$) withdrawal line 40 leads from the stage 32.

The line 40 leads into a plasma reduction stage 42 which comprises a continuous plasma reduction reactor. A magnesium (Mg) addition line 44 leads into the stage 42.

In the plasma reduction reactor, a single or multiple non-transfer arc plasma torch is mounted on a water-cooled injector block where the reactants are introduced to the plasma tail flame through two diametrically opposed feed orifices. The injector block is mounted on the axis of the water-cooled reactor of which the lower section serves as product catch pot where the product (metallic zirconium) is collected.

The plasma reactor typically has an inclined off-gas outlet where plasma gas, vapours and entrained particulates are extracted, cooled in a heat exchanger and solids collected in a cyclone and filter arrangement. The reactor has linear (axial) flow geometry.

A product withdrawal line 46 leads from the stage 42 into a high temperature separation stage 48. A purified zirconium sponge product withdrawal line 50 leads from the stage 48 as does an $Mg/MgCl_2$ withdrawal line 52.

In use, zircon ($ZrSiO_4$) is fed into the plasma dissociation stage 12. By means of plasma dissociation, it is converted into PDZ, i.e. $ZrO_2 \cdot SiO_2$ in accordance with reaction (10):

$$ZrSiO_4 \rightarrow ZrO_2 \cdot SiO_2 \qquad (10)$$

Usually, zircon will also contain some hafnium in the form of $HfSiO_4$ which will thus be converted to $HfO_2 \cdot SiO_2$. Thus, the PDZ produced in the plasma reactor stage 12 will comprise both $ZrO_2.SiO_2$ and $HfO_2.SiO_2$, commonly written as $Zr(Hf)O_2.SiO_2$. PDZ is an advantageous feed material due to its much higher chemical reactivity (as compared to zircon), especially towards fluoride chemicals. Furthermore, zircon, when used for the production of PDZ, requires no pre-milling.

The PDZ produced in the stage 12 passes, along the line 16, into the reaction stage 18 where it is converted to Zr and Si species in accordance with reaction (6) hereinbefore set out. It will be appreciated that, since the PDZ may also contain $HfO_2.SiO_2$, Hf species, similar to the Zr species of reaction (1), will also form.

Separation of the Zr/Hf species from the Si species is accomplished by heating the products formed in reaction stage 18. Initially, the Si species $((NH_4)_2SiF_6)$ evaporates at around 280° C., and is withdrawn as an off-gas product along the line 22, together with the ammonium fluoride ($NH_4F$) and water that is formed in accordance with reaction (1).

Thereafter, at around 450° C., the zirconium species is decomposed to produce anhydrous $ZrF_4$ in accordance with reaction (2) (for the hafnium species a similar reaction takes place to obtain anhydrous $HfF_4$).

The $ZrF_4/HfF_4$ product is withdrawn from the stage 18 along the line 24 and passes into the separation stage 26.

The off-gas withdrawn along the line 22 from the stage 18, can be treated further, e.g. the $(NH_4)_2SiF_6$ can be decomposed to produce $SiF_4$ and ammonium fluoride $NH_4F$, which can be recycled to the stage 18. $SiF_4$ is a saleable product on its own for use in the electronic industry. Instead, it can be used to produce fumed $SiO_2$ (pyrogenic silica) in accordance with reaction (11):

$$SiF_4 + 2H_2O \rightarrow SiO_2 + 4HF \quad (11)$$

The HF produced in accordance with reaction (11) can be recovered and recycled.

It will be appreciated that the stage 26 can be dispensed with if desired, e.g. if a mixed product comprising zirconium and hafnium in powdered metallic form, is acceptable. However, if nuclear grade zirconium metal is required as an end product, then the stage 26 must be present. Separation of $ZrF_4$ from $HfF_4$ can be achieved in the stage 26 by means of a process such as sublimation, selective precipitation and crystallization, liquid/liquid extraction, pertraction or evaporative distillation.

A $HfF_4$ product is withdrawn from the stage 26 along the line 28, and can be treated further, e.g. to obtain Hf metal, such as by using a plasma reduction stage similar to the plasma reduction stage 42.

Some of the $ZrF_4$ withdrawn from the stage 26 along the line 30, can be withdrawn as a product along the line 34 for use in the optical industry, e.g. to produce specialized lenses, thin film coatings on lenses, optical fibre. However, the bulk, if not all, of the anhydrous $ZrF_4$ produced in the stage 26 passes into the conversion stage 32 where it is converted, through reaction with $MgCl_2$, into $ZrCl_4$. The reason for converting $ZrF_4$ to $ZrCl_4$ is that this facilitates subsequent plasma reduction to produce powdered metal, and also assists in purification of the powdered metal produced in the subsequent stage 48. The reaction in the stage 32 is in accordance with reaction (4).

$ZrCl_4$ is withdrawn from the stage 32 and passes into the plasma reduction stage 42 where it is subjected to continuous reduction with Mg as a reductant. It will be appreciated that, if required, Mg can be replaced by another reductant such as Ca or Zn, or reduction gases such as $H_2$ and $NH_3$.

The continuous plasma reduction reactor in the stage 42 provides a non-transferred arc plasma for carrying out the plasma reduction. The plasma is generated with a plasma gas, or mixtures of plasma gases, such as argon and nitrogen. The feedstock may be introduced into the reactor typically by means of a feed mechanism that is associated with the reactor. The feedstock may be introduced into the plasma reactor above the plasma flame, directly into the plasma flame or beneath the plasma flame. Typically, the feedstock is introduced into a tail flame of the plasma reactor.

The residence time and temperature gradient in the plasma reactor is such that molten droplets of metallic zirconium that form, coagulate and freeze (solidify) as particulates. Thus, the metallic zirconium collects as a powder at the relatively cool product collection point of the reactor.

In the stage 42, zirconium powder together with $Mg/MgCl_2$ are produced, and are fed, along the line 46, into the high temperature separation stage 48. Typically, the high temperature separation stage 48 comprises a vacuum arc furnace, or an electron beam melting apparatus. An off-product comprising $Mg/MgCl_4$ is withdrawn along the line 52, while purified zirconium metal sponge is withdrawn along the line 50.

The Applicant is aware of a known chemical process for producing purified zirconium sponge from zircon. This known process comprises milling zircon, pelletizing the milled zircon with carbon, subjecting the resultant pelletized product to chlorination in a fluidized bed, thereafter subjecting it to selective condensation, hydrolysis, and liquid/liquid extraction with thiocyanate to obtain $ZrOCl_2$. The $ZrOCl_2$ is subjected to precipitation with sulphuric acid and ammonium hydroxide, with the product being filtered and dried in a furnace. The $ZrO_2$ is treated in a chlorination fluidized bed to obtain $ZrCl_4$ which is subjected to reduction in a Kroll batch reactor with magnesium as reductant to obtain an ingot of zirconium sponge. This ingot must then be subjected to milling, vacuum distillation separation to remove $Mg/MgCl_2$, and further milling to obtain purified zirconium sponge.

Disadvantages associated with this conventional process include the fact that it constitutes several major unit operations including more than one high temperature carbo-chlorination and 3 milling operations. The zircon must be milled prior to carbo-chlorination, and then bricketted with carbon. It is a wet process which results in copious volumes of waste being produced. Significant waste streams are produced, and the kinetics in the reactor stages such as the chlorination fluidized bed, are slow. It is energy intensive, and produces large volumes of chlorides which are difficult to recover/recycle. Moreover, the Kroll reduction is typically a batch process, albeit a dry process.

In contrast, the process 10 only comprises 6 unit operations, and is a dry process so that less waste is produced than is the case in the conventional wet process, thereby rendering the process more environmentally friendly as regards waste production. Instead of batch reduction of the $ZrCl_4$ as in the conventional process, a continuous plasma reduction step is employed. At least some fluorine values can be recovered/recycled. The reactor 18 of the process 10 employs fast kinetics and is this thus not a limiting step. Additionally, no milling of the product is required since the zirconium metal recovered is already in the form of a powder. Still further, ammonium bifluoride and ammonium acid fluorides are available as waste products from $NF_3$ or fertilizer plants. The process of the invention has the flexibility of producing either hafnium-"free" or hafnium depleted nuclear grade zirconium metal (by employing the stage 26) or non-nuclear grade zirconium metal (by omitting the stage 26).

The invention claimed is:

1. A process for treating a zirconium containing feedstock, which includes fluorinating a feedstock comprising dissociated zircon ('DZ') to obtain a zirconium fluorine compound and a silicon fluorine compound;

separating the zirconium fluorine compound from the silicon fluorine compound;

reacting the zirconium fluorine compound with a non-fluorine halogen, an alkali metal non-fluorine halide or an alkaline-earth metal non-fluorine halide, thereby to obtain a zirconium non-fluorine halide; and subjecting the zirconium non-fluorine halide to plasma reduction, in a plasma reduction stage, in the presence of a reductant, by introducing a feedstock comprising the zirconium non-fluorine halide into a tail flame of a plasma reactor, to obtain metallic zirconium in powdered form.

2. A process according to claim 1, wherein the feedstock is plasma dissociated zircon ('PDZ') predominantly comprising $ZrO_2.SiO_2$.

3. A process according to claim 2, wherein the fluorination of the feedstock comprises reacting the PDZ with an ammonium acid fluoride having the formula $NH_4F.xHF$ where $1<x\leq5$.

4. A process according to claim 2, wherein the fluorination of the feedstock comprises reacting the PDZ with ammonium bifluoride, $NH_4F.HF$, in accordance with reaction (1):

$$ZrO_2.SiO_2 + 8NH_4F.HF \rightarrow (NH_4)_3 ZrF_7 + (NH_4)_2 SiF_6 + 3NH_4F + 4H_2O \quad tm(1)$$

with the $(NH_4)_3ZrF_7$, $(NH_4)_2SiF_6$, $3NH_4F$ and $4H_2O$ thus constituting a reaction product mixture.

5. A process according to claim 4, wherein the separation of the zirconium fluorine compound (($NH_4)_3ZrF_7$) from the silicon fluorine compound ($(NH_4)_2SiF_6$) is effected by heating the reaction product mixture to a sufficiently high temperature so that the $(NH_4)_2SiF_6$, $NH_4F$ and $H_2O$ are driven off as a gaseous product component, while the $(NH_4)_3ZrF_7$ remains behind as a solid component; heating the solid component further so that the $(NH_4)_3ZrF_7$ decomposes in accordance with reaction (2):

$$(NH_4)_3ZrF_7 \rightarrow ZrF_4 + 3NH_4F \quad (2)$$

and separating the $ZrF_4$ from the $NH_4F$.

6. A process according to claim 5, wherein the zirconium fluorine compound ($ZrF_4$) is reacted with an alkaline-earth metal non-fluorine halide in a high temperature stage, and wherein the alkaline-earth metal non-fluorine halide is $MgCl_2$, with the reaction proceeding in accordance with reaction (4):

$$ZrF_4 + 2MgCl_2 \rightarrow ZrCl_4 + 2MgF_2 \quad (4).$$

7. A process according to claim 5, wherein the PDZ feedstock also contains some hafnium, Hf.

8. A process according to claim 7, wherein $HfF_4$ is also produced, and which includes separating the $ZrF_4$ from the $HfF_4$.

9. A process according to claim 1, wherein the reductant is a metal selected from the group consisting in Mg, Ca and, Zn.

10. A process according to claim 1, wherein the reductant is a reducing gas selected from the group consisting of $H_2$ and $NH_3$.

11. A process according to claim 1, wherein the plasma reactor provides a non-transferred arc plasma for carrying out the plasma reduction.

12. A process according to claim 1 wherein, in the plasma reduction stage, a product component comprising the zirconium in powdered metallic form and a reductant halide is produced, with the product component being treated in a high temperature separation stage to produce the reductant halide as an off-product and the zirconium in a purified metal sponge form as a useful end product.

13. A process according to claim 1, wherein the plasma reduction is effected on a continuous basis.

* * * * *